A. MARCH.

Improvement in Three Horse Equalizers.

No. 124,692.                                Patented March 19, 1872.

½ Section        ½ Plan

WITNESSES
O. W. Bond
Wm H Wright

INVENTOR
Aaron March.
By West & Bond
His Attorneys 124,692

UNITED STATES PATENT OFFICE.

AARON MARCH, OF TAYLOR, ILLINOIS.

IMPROVEMENT IN THREE-HORSE EQUALIZERS.

Specification forming part of Letters Patent No. 124,692, dated March 19, 1872.

SPECIFICATION.

I, AARON MARCH, of the town of Taylor, in the county of Ogle and State of Illinois, have invented certain new and useful Improvements in Three-Horse Eveners, of which the following is a full description, reference being had to the accompanying drawing making a part of this specification, in which—

Figure 1:
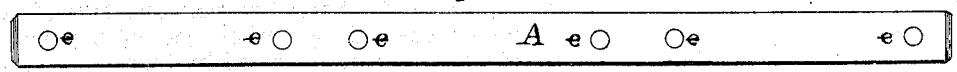
Figure 2:
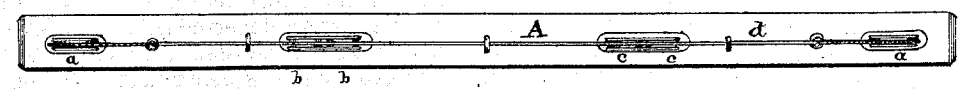
Figure 3:
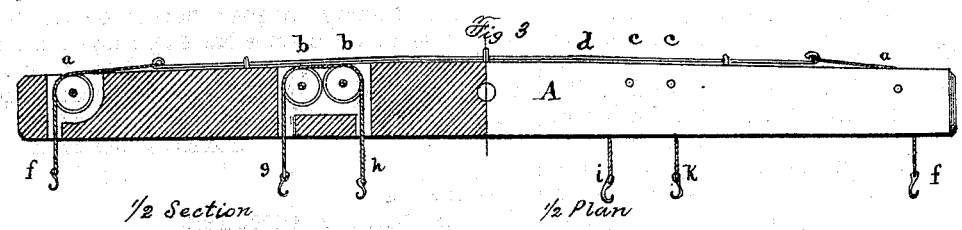

Figure 1 is a front view; Fig. 2, a rear view; and Fig. 3, a plan view of one half of the device, and a horizontal section of the other half.

The object of my invention is to construct a three-horse evener, by the use of which the draft of the several horses will be more perfectly equalized.

In the drawing, A represents the evener-bar, which should be about seven and one-half feet in length; $a$, pulleys, one near each end of the bar; $b\ b\ c\ c$, two pairs or sets of pulleys, which are placed equidistant from the center of the bar; $d$, a rod extending along the greater portion of the back side of the bar, and held in place by suitable staples—in place of this rod a chain may be used if desired; $e$, holes through which the chains pass. Attached to each end of the rod $d$ is a small chain, $f$, passing over the pulleys $a$. $g\ h$ is a chain passing over the two pulleys $b\ b$; and $i\ k$, another chain, which passes over the two pulleys $c\ c$, all of the chains having hooks at their ends to which traces may be attached. The central horse must be attached to the chain $h\ i$, and the outer horses respectively to the chains $f\ g$ and $k\ f$. It will be observed that the chains $f\ f$ and rod $d$ form, in fact, a continuous chain extending the whole length of the evener-bar, and over the pulleys $a$ at the ends thereof, so that one half of the power exerted by either one of the outer horses is counterbalanced by that exerted by the other outer horse. By the arrangement of the pulleys and chains, as shown and described, the power exerted by one of the outer horses is counterbalanced by the other two horses, and the power exerted by the center horse is counterbalanced by the other two. As shown, the pulleys are inserted into the evener-bar, but they might be placed upon the top thereof, suitable devices being used for keeping the chains in place.

What I claim as new is as follows:

The three-horse evener herein described, consisting of the evener-bar A, pulleys $a\ a\ b\ b\ c\ c$, and chains $f\ f\ g\ h\ i\ k$, and rod or chain $d$, all constructed and arranged to operate substantially as and for the purposes specified.

AARON MARCH.

Witnesses:
EDWARD F. DUTCHER,
M. L. ETTINGER.